Aug. 4, 1959  C. S. IVORY  2,897,597
DENTAL COTTON ROLL HOLDER
Filed Aug. 20, 1958
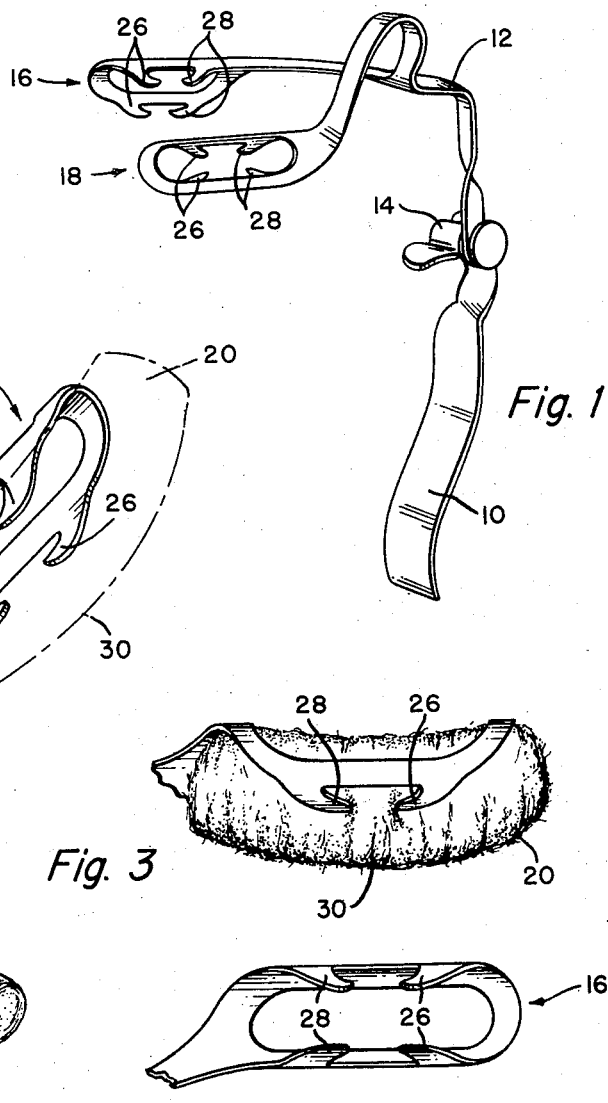
INVENTOR.
CHESTER S. IVORY
BY
ATTORNEY

2,897,597

DENTAL COTTON ROLL HOLDER

Chester S. Ivory, Bala Cynwyd, Pa.

Application August 20, 1958, Serial No. 756,226

1 Claim. (Cl. 32—35)

When a dentist has to work on a tooth, he uses cylindrical rolls made of absorbent cotton, one on each side of the denture, to keep the tooth dry. These rolls are approximately one and one-half inches long and approximately one-half inch in diameter.

The rolls are held in position in the mouth by means of a holder which includes two pairs of jaws, one pair being disposed on the buccal and the other pair on the lingual side of the denture. The juxtaposed edges of each pair of jaws were formerly provided with rectilinear prongs which were disposed at a right angle to the longitudinal axes of the jaws and adapted radially to pierce the opposite sides of the roll.

Holders of the type referred to are generally satisfactory, but I have discovered that the structure and orientation of the prongs made engagement of the prongs with the cotton rolls difficult and there was a tendency for the rolls to drop off the prongs. This was due to the fact that, as above stated, the prongs on the opposite sides of each pair of jaws were disposed radially of the cylindrical cotton roll, and due to the fact that the cotton rolls are longitudinally but not radially compressible.

The object of my invention is to eliminate this difficulty without in any way interfering with the otherwise acceptable construction of the holder referred to.

The full nature of my invention will be understood from the following specification and the accompanying drawings in which:

Fig. 1 is a perspective view of a cotton roll holder embodying my invention.

Fig. 2 is an enlarged, fragmentary perspective view of one of the jaws of the holder showing the improved arrangement of the cotton roll engaging prongs.

Fig. 3 is an enlarged, fragmentary side elevational view of one of the jaws of the holder.

Fig. 4 is a bottom plan view of the jaw shown in Fig. 2.

Fig. 5 is a perspective view of a cotton roll as it appears before it engages with the cotton holder.

As stated, the holder itself is conventional, but, to make reference to the prior patent in which it is disclosed unnecessary, it is pointed out that the holder includes a lower arm 10 which is pivotally connected to upper arm 12 and which is retained in any position to which it is adjusted by wing nut 14. Upper arm 12 branches out to form two pairs of jaws 16 and 18, each of which is adapted to carry a roll of cotton 20. When jaws 16 and 18 are placed in the mouth, one on each side of a tooth to be operated on, lower arm 10 is moved into engagement with the underside of the chin and wing nut 14 is tightened to hold the jaws in position in the mouth of the patient.

The opposite sides of each pair of jaws of the holder shown in the patent referred to were provided with prongs which were disposed at a right angle to the respective sides and could only engage the cotton roll by piercing it radially.

But, cotton rolls used for this purpose are rather tightly wound and are not appreciably compressible in the direction of their radii. This made engagement of the prongs of the prior art with the cotton rolls difficult and this difficulty was accentuated by the very limited space available between opposite sides of each pair of jaws. Also, the insertion of the prongs on one side of a jaw into one side of a cotton roll, made insertion of the prongs on the other side of the jaw with the other side of the roll difficult. This was due to the fact that, if the roll is engaged with one set of prongs, it was not readily accessible for engagement with the opposite prongs. Furthermore, because of the absence of any following pressure, the cotton roll, when saturated with saliva, tended to fall off the prongs. This can be very discomforting to the patient and to the doctor.

According to my invention, the prongs 26 and 28 on each jaw extend longitudinally of the axis of the cotton roll 20, with their points facing each other, as best shown in Fig. 2. By this arrangement, one set of prongs, such as springs 26, are first engaged by pushing the cotton roll against them, or to the left as shown in Fig. 1. This compresses the roll in the direction of its length so that, when the roll is pushed in the opposite direction into engagement with prongs 28, the roll will bulge as at 30. This is due to the fact that the roll is more compressible in the direction of its length than it is in the direction of its diameter. Also, the orientation of the prongs according to my invention facilitates the engagement and disengagement of the roll with the prongs. Because, when the cotton roll is thus engaged by prongs 26 and 28, its central portion bulges out, as shown in broken lines in Fig. 2. The cheeks are pushed further out of the way and contact between the metal jaws and the gum is eliminated. Also, the axial compression of the cotton roll exerts pressure against prongs 26 and 28 and thus more firmly engages the roll with the prongs. In other words, the cotton roll cannot fall off even when it is saturated.

What I claim is:

A holding device for holding an elongated, cylindrical dental cotton roll, said device including a pair of jaws having elongated spaced parallel edges, and a pair of spaced prongs carried by each of said edges, the prongs of each pair being spaced from, and extending longitudinally of its respective edge with the free ends of said prongs pointing toward, and being spaced from, each other, whereby engagement of one end portion of said roll with one of said prongs by pressure of said roll in the direction of its longitudinal axis against said prong deflects said roll into an arcuate shape which is not wholly eliminated by engagement of the other end portion of said roll with the other of said prongs by reverse pressure of said other end portion of said roll against the other of said prongs.

References Cited in the file of this patent

UNITED STATES PATENTS 1,010,146  Ivory _____ Nov. 28, 1911